United States Patent

[11] 3,570,817

| [72] | Inventor | Patrick H. Claussen |
| | | Columbia, Mo. |
| [21] | Appl. No. | 775,633 |
| [22] | Filed | Nov. 14, 1968 |
| [45] | Patented | Mar. 16, 1971 |
| [73] | Assignee | Fipps, Inc. |
| | | Wellsville, Mo. |

[54] BLENDING MACHINE
11 Claims, 4 Drawing Figs.

[52] U.S. Cl. ................................................. 259/4,
259/27, 259/46, 259/180
[51] Int. Cl. ......................................... B01f 15/04
[50] Field of Search........................... 259/150,
180, 36, 45, 6, 46, 47, 27, 70, 71, 9, 10, 68, 69, 4

[56] References Cited
UNITED STATES PATENTS
2,401,913  6/1946  Dawson..................... 259/47
2,859,017  11/1958  Trumbull...................... 259/47
2,948,920  8/1960  Hausman....................... 259/47X
3,078,076  2/1963  Ferguson....................... 259/180

*Primary Examiner*—Robert W. Jenkins
*Attorney*—Cohn & Powell

ABSTRACT: The blending machine includes a container which is adapted to hold successive layers of granular materials. The front wall of the container includes a plurality of closed louvers which, when open, form a plurality of vertically related dispensing apertures. The rear wall of the container is a movable plate, which when urged against the material in the container, forces the material through the dispensing apertures in proportion to the thickness of each layer. The granular material from each layer is blended by free fall and collected into a trough disposed below the apertures, the trough housing a screw conveyor which further blends and transports the granular material to a point of discharge.

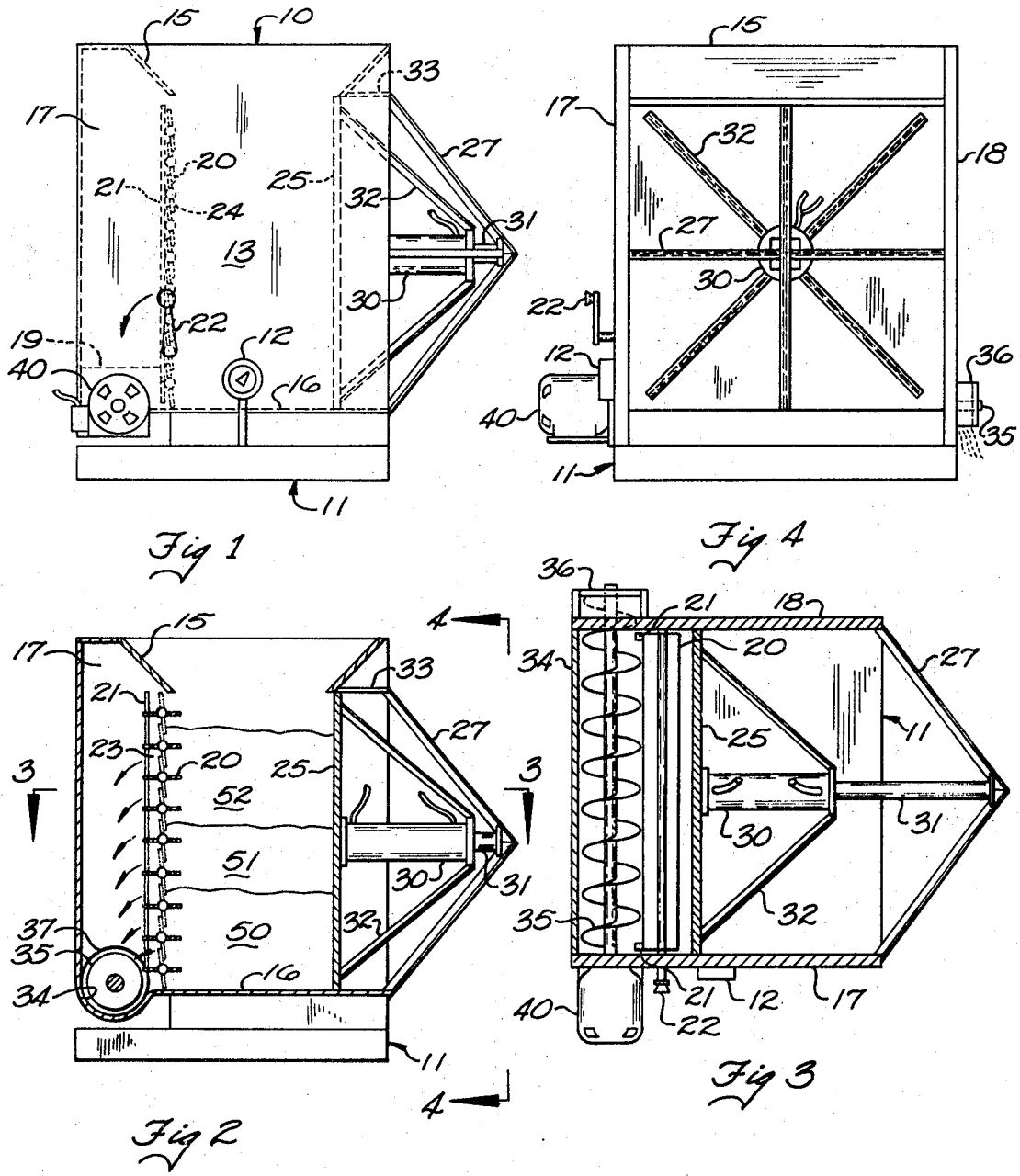

3,570,817

1

BLENDING MACHINE

BACKGROUND OF THE INVENTION

This invention relates generally to machinery for blending granular material, and in particular, to machinery for mixing fertilizer ingredients or farm feed ingredients.

The blending of dissimilar granular materials into a suitable mix designed for a specific purpose, such as the production of a custom formula fertilizer, or a particular blend of animal feed, is carried out constantly on farms both large and small. Many machines have been designed to satisfy the need for effective blenders and a general survey reveals that, by and large, the equipment used for this purpose is cumbersome and complex. One type of mixing machine currently in use provides a bin subdivided into adjacent hopperlike chambers, each of which contains one of the ingredients of feed formula mix. The material is released from the subdivided chambers in predetermined quantities by an adjustable control gate and into a common chamber. From this common chamber, the material is fed into a screw conveyor for mixing.

Much of the machinery presently in use appears to be a variation of this general principle of providing a compartmentalized bin discharging into a screw conveyor for mixing. However, there is also a line of machinery which utilizes various augers or screw conveyors of particular design or arrangement. Representative of such machinery is a device which incorporates a variable volume auger. This auger is manually adjustable to vary the volumetric space between the auger flights and thereby control the blending ratios between a plurality of bulk materials supplied to the assembly. Another device in this general category utilizes a cross-network of screw conveyors for the mixing process. However this particular type of machinery appears to have greater significance in the matter of distribution of the mix material.

SUMMARY OF THE INVENTION

The device incorporating this invention requires only one chamber for efficient use. Partitions subdividing the material in this chamber are not required. The chamber may be conveniently rectangular in form, thereby avoiding the wasted space which results from chambers having a hopper configuration.

An effective, first-mixing stage is accomplished before the materials are dispensed into a screw conveyor for transportation to a point of discharge. Elaborate arrangements of screw conveyors are totally unnecessary in the present invention.

The principles involved in the present machinery reduce the number of working parts to an absolute minimum, with the result that the machinery is of a simplicity heretofore unattainable.

The blending machine includes a container adapted to hold successive layers of granular material. A dispensing means is provided at one side of the container, the dispensing means including a plurality of apertures disposed in spaced vertical relation adjacent to the layers of granular material.

A pusher means, including a movable wall disposed at the opposite side of the container, selectively urges the granular material toward and through the dispensing apertures. The dispensing apertures are provided by selectively adjustable louvers coupled together by means of a link for movement between open and closed positions. The louvers extend transversely between a pair of retaining walls forming opposite sides of the container, and in the open position provide a plurality of vertically aligned, slotted apertures. When closed, the louvers provide a substantially imperforate retaining wall substantially parallel to the movable wall provided by the pusher means.

Actuating means is provided for moving the pusher means, the actuating means including an adjustable arm. The arm is provided by a hydraulic ram, supported at one end in fixed relation to the container, and attached at the other end to the movable wall. The arm is adapted to pushed the movable wall and eject predetermined quantities of the successive layers through the apertures in a vertically commingling stream, thereby constituting a first mixing stage.

A trough is disposed below the louvers whereby to collect the commingled material and a screw conveyor disposed within the trough, constituting a second mixing stage, further mixes and transports the commingled material to a point of discharge.

BRIEF DESCRIPTION OF THE DRAWING

FIG. 1 is a side elevational view of the blending machinery incorporating a weight scale;

FIG. 2 is a sectional view illustrating the relative disposition of the louvered apertures and the movable pusher wall prior to dispensing of the materials;

FIG. 3 is a plan view of the machinery, partly in cross section, taken on line 3—3 of FIG. 2 and illustrating the disposition of the louvered apertures relative to the pusher wall when the materials have been dispensed; and FIG. 4 is a rear view of the machinery taken on line 4—of FIG. 2.

DESCRIPTION OF THE PREFERRED EMBODIMENT

Referring now by characters of reference to the drawing and first to FIG. 1, it will be understood that the blending machine 10 is supported by a weight scale 11 which includes an indicator 12.

The blending machine 10 includes a walled container 13 having an open upper end 14, which is served by a hopper 15. The hopper 15 facilitates the admittance of granular materials into the interior of the container 13. The container 13 includes a pair of oppositely facing side plates 17 and 18 constituting opposed retaining walls. A plurality of adjustable vanes or louvers 20 extend tranversely between, and are pivotally mounted to the side plates 17 and 18, and are interconnected in coupled relation by means of a coupling link 21 which is pivotally attached to each louver 20. A lever 22 may be operated manually to open and close the louvers 20 in concert.

In their open position, the louvers 20 provide a plurality of dispensing apertures 23 disposed in spaced vertical relation to each other. When the louvers 20 are closed, they provide a substantially imperforate front retaining wall 24 for the container 13.

The rear wall of the container 13 is provided by a movable plate or wall 25 which extends transversely between the side plates 17 and 18 and vertically between the lower plate 16 and the hopper 15 in the initial position. A plurality of outrigger struts 27 are attached to the top, bottom and sides of the container 13, as by welding, to support an extensible arm which is provided by a hydraulic ram having a cylinder 30 and a plunger 31, the ram constituting an actuating means. The cylinder 30 is attached in substantially perpendicular relation to the movable wall 25 and is rigidly supported thereto by means of a plurality of support struts 32 extending between the movable wall 25 and the remote end of the cylinder 30.

The plunger 31 is likewise rigidly attached to the projecting framework provided by the outrigger struts 27. The struts 27 provide support backup for the plunger 31 which is disposed in fixed relation to the container 13. A transversely disposed upper plate 33 is provided, which extends between the side plates 17 and 18 and facilitates the connection of the upper outrigger struts 27 to the container 13.

At the front end of the blending machine 10 and disposed below the apertures 23 is a trough 34. The trough 34 is disposed substantially in adjacent lengthwise relation to the louvers 20 and provides a housing for a screw conveyor 35. The screw conveyor is rotatively mounted between the side plate 17 and a U-shaped support frame 36 which is welded or otherwise attached to the side plate 18. A circular hole 37 in the side plate 18 permits material to be conveyed by the screw conveyor 35 to a point of discharge at the end of the screw conveyor 35 and beyond the horizontal limits of the louvrecreated apertures 23. An electric motor 40 is attached to the side plate 17 to provide a drive means driving the screw conveyor 35.

The blending machine 10 includes a front guard plate 41 which extends between the side plates 17 and 18 in a transverse direction and is attached to the hopper 15 and the trough 34. The guard plate 41 provides a shield preventing inadvertent random dispensing of the blended material.

It is thought that the structural and functional advantages of the blending machine 10 have become fully apparent, but for completeness of disclosure, the operation of the blending machine will be briefly described.

Before the container 13 is filled with granulated materials, the louvers 20 are manipulated into their closed position to form a continuous, substantially imperforate front wall 24. The movable rear wall 25 is disposed in its contracted position.

The container 13 is filled with successive layers of granular materials 50, 51 and 52 which, in the case of fertilizer formulas, may be represented by nitrogen, phosphate and potash respectively. These granular materials are, in general, supplied to the hopper 15 by means of a dump truck and the layers 50, 51 and 52 are preferably level, although this is not essential.

The quantity of each of the ingredients 50, 51 and 52 to be utilized in the desired blend, may be measured by weight, by observing the indicator 12 of the weight scale 11, and by comparing cumulative readings. Obviously, the weight scale indicator 12 may be adjusted to show a zero reading when carrying the weight of the empty blending machine 10.

When the container 13 is filled with the desired amount of material, each layer of material 50, 51 and 52 is disposed adjacently of the imperforate front wall 24 formed by the closed louvers 20. Preferably the louvers 20 which, in effect, constitute closure means for the apertures 23, are of the same size and vertical spacing. When this is the case, and the louvers 20 are opened by manipulation of the lever 22 to provide a plurality of apertures 23, the number of apertures and therefore the aperture area adjacent to each layer of granular material 50, 51 and 52, will be related to the thickness of that layer. When the hydraulic ram mechanism is operated, the movable wall 25, constituting part of a pusher means, is forced against the layers of material 50, 51 and 52. This action urges the layers toward and through the dispensing apertures 23 provided by the open louvers 20. As the pushing action continues, the total height of the granular material remains substantially unaltered. However, as the material is pushed through the dispensing apertures 23, the material falls from each aperture in a substantially vertical stream substantially in proportion to the thickness of each layer 50, 51 and 52, and the material is thereby commingled in a first mixing stage.

The commingled material is collected in the trough 34 and is further mixed and transported to a point of discharge at the end of the trough 34 by the screw conveyor 35, this mixing constituting a second mixing stage. The blended material may be bagged at the point of discharge or, if the blending machine 10 is made mobile by mounting it on a truck, a spout, not shown, may be attached at the point of discharge to direct the blended materials directly delivered to their point of use. This would be useful in the case of the spreading of fertilizing material. It will be readily understood that the trough 34 and the screw conveyor 35 could be easily modified as an independent unit, incorporating the support 36, and hingedly attached to side plate 17, for example, about a hinge line indicated by numeral 19, for swinging motion such that the point of discharge could be raised or lowered.

The hydraulic ram may be inactivated at any time and the louvers closed before the container is emptied. Thus, whenever blending in the same proportions is again required, it is merely necessary to open the louvers and activate the hydraulic pushing mechanism. The reason for this is that the proportions of the material, which are delivered through the dispensing apertures, are predetermined by the depth of each layer of granular material.

I claim:

1. In a blending machine:
   a. a container adapted to hold successive layers of granular materials;
   b. dispensing means at one side of the container, the dispensing means including a plurality of dispensing apertures adjacent the layers of granular materials; and
   c. pusher means selectively urging the layers of granular materials toward and through the dispensing apertures, each layer being discharged through the apertures adjacent said layer, and commingled in predetermined proportion with each other layer upon discharge.

2. A blending machine as defined in claim 1, in which the proportions of the mix upon discharge being related to the aperture area adjacent each layer.

3. A blending machine as defined in claim 1, in which the dispensing means includes a stationary wall having closure means selectively closing the dispensing apertures that are in said wall.

4. In a blending machine:
   a. a container adapted to hold successive layers of granular materials;
   b. dispensing means at one side of the container, the dispensing means including a plurality of dispensing apertures adjacent the layers of granular materials;
   c. pusher means selectively urging the granular materials toward and through the dispensing apertures;
   d. the container including opposed retaining walls, an upper access end and a lower closed end;
   e. the dispensing apertures at one side of the container being disposed between the retaining walls in spaced, vertical relation to each other;
   f. the pusher means including a movable wall disposed between retaining walls in selected, spaced relation to the dispensing means; and
   g. the actuating means including an adjustable arm attached to the movable wall.

5. A blender as defined in claim 4, in which:
   h. the dispensing apertures are provided by selectively adjustable louvers; and
   i. link means interconnects the louvers in coupled relation for movement between open and closed positions.

6. A blender as defined in claim 4, in which:
   h. support means is attached to the container in fixed relation to the dispensing means; and
   i. the adjustable arm is provided by an hydraulic ram extending selectively between the movable plate and the support means.

7. A blender as defined in claim 4, in which:
   h. a trough is disposed below the dispensing apertures and transversely of the retaining walls; and
   i. a screw conveyor is disposed in the trough and is adapted to discharge the granular material at one end thereof.

8. In a blending machine:
   a. a container adapted to hold successive layers of granular materials.
   a. a container adapted to hold successive layers of granular materials;
   b. dispensing means at one side of the container, the dispensing means including a plurality of dispensing apertures adjacent the layers of granular materials;
   c. pusher means selectively urging the granular materials toward and through the dispensing apertures;
   d. the container being substantially rectangular and including a first pair of spaced, oppositely facing retaining walls;
   e. the dispensing means including a plurality of vertically related adjustable louvers extending transversely between the retaining walls, the louvers being adjustable between open and closed positions, the louvers forming dispensing apertures in the open position and providing a substantially imperforate retaining wall in the closed position;
   f. the pusher means including a movable wall extending transversely between the retaining walls in selected, spaced relation from the dispensing means; and g. the actuating means including an adjustable arm moving the movable wall toward the dispensing means whereby to eject predetermined quantities of the successive layers of material through the apertures in a vertically commingling stream.

9. A blending machine as defined in claim 8, in which:
   h. a trough is disposed below the louvers to receive the dispensed, commingled granular material; and
   i. a screw conveyor is housed within the trough further to commingle and transport the dispensed granular material to a point of discharge.

10. A method of blending predetermined quantities of granular materials comprising the steps of:
   a. depositing a predetermined quantity of granular material in a container to form a first layer;
   b. depositing a predetermined quantity of dissimilar granular material over the first layer to form a second, superjacent layer in the container;
   c. opening the container selectively to provide a first aperture adjacent the first layer and a second aperture adjacent the second layer; and
   d. pushing the layers of granular material through the apertures while substantially maintaining the total height of said layers, whereby to dispense the dissimilar materials into a free-falling commingling stream.

11. A method of blending granular materials as defined in claim 10 including the additional steps of:
   e. collecting the commingled materials in a trough; and
   f. transporting the collected material to a point of discharge.